United States Patent [19]

Jensen

[11] Patent Number: 5,031,853
[45] Date of Patent: Jul. 16, 1991

[54] FILM-THRUSTING CASSETTE

[75] Inventor: Thomas D. Jensen, Himrod, N.Y.

[73] Assignee: Eastman Kodak Company, Rochester, N.Y.

[21] Appl. No.: 464,254

[22] Filed: Jan. 12, 1990

[51] Int. Cl.$^5$ .............................................. G03B 17/26
[52] U.S. Cl. ............................... 242/71.1; 354/275
[58] Field of Search ........................ 242/71, 71.1, 71.8, 242/71.9, 210; 354/216, 275

[56] References Cited

U.S. PATENT DOCUMENTS

| | | | |
|---|---|---|---|
| 3,556,435 | 1/1971 | Wangerin | 242/210 |
| 4,407,579 | 10/1983 | Huff | 354/275 |
| 4,741,439 | 5/1988 | Bizic | 206/316 |
| 4,846,418 | 7/1989 | Fairman | 242/71.1 |
| 4,887,776 | 12/1989 | Niedospial, Jr. et al. | 242/71.1 |

FOREIGN PATENT DOCUMENTS 2921379  5/1979  Fed. Rep. of Germany.

Primary Examiner—Daniel P. Stodola
Assistant Examiner—John Q. Nguyen
Attorney, Agent, or Firm—Roger A. Fields

[57] ABSTRACT

In a film cassette capable of propelling a non-protruding film leader to the exterior of the cassette shell, a camming flange is rotated coaxially with respect to a film spool in a film unwinding direction to deflect one of the flanges of the spool firmly against the outermost convolution of the film roll wound on the spool. This enables rotation of the spool in the same direction to propel the film leader out of the cassette shell.

8 Claims, 5 Drawing Sheets

FILM-THRUSTING CASSETTE

CROSS-REFERENCE TO RELATED APPLICATIONS

Reference is made to commonly assigned copending applications Ser. No. 320,441, entitled FILM CASSETTE, and filed Mar. 8, 1989 in the name of John J. Niedospial, and Ser. No. 07-464,256, entitled FILM CASSETTE, and filed Jan. 12, 1990 in the name of Thomas D. Jensen.

BACKGROUND OF THE INVENTION

1. Field of the Invention

The invention relates generally to the field of photography, and particularly to a film cassette containing roll film. More particularly, the invention relates to a film cassette capable of propelling a non-protruding film leader to the exterior of the cassette shell.

2. Description of the Prior Art.

In conventional 35mm film manufacturers' cassettes, such as manufactured by Eastman Kodak Company and Fuji Photo Film Co. Ltd., the filmstrip is wound on a flanged spool which is rotatably supported within a cylindrical shell. A leading section of the filmstrip approximately 2¾ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35mm camera to engage the protruding leader section to draw the filmstrip out of the shell.

A 35mm film cassette has been proposed which, unlike conventional film cassettes, can be operated to automatically advance the filmstrip out of the cassette shell by rotating the film spool in the unwinding direction. The film leader normally does not protrude from the cassette shell. Specifically, in U.S. Pat. No. 4,407,579, granted Oct. 4, 1983, there is disclosed a film cassette wherein the film spool is comprised of two spool pieces constructed to telescopically receive one another. Each spool piece includes a radially extending flange which is adapted to lie closely adjacent to but not in contact with one of the opposite sides of the film roll. A trailing end of the film roll is attached to one of the spool pieces, and a leading end of the roll rests against a cylindrical insert located between the two flanges and the cassette shell. The insert restricts the maximum diameter of the film roll to a value less than the diameter of the flanges, and it includes an integral stripper-guide located immediately ahead of a slot in the insert which leads to the light-trapped film passage opening of the cassette shell. To move the leading end of the film roll over the stripper-guide, into the slot, and through the light-trapped opening, to make it available outside the film cassette, one must manually grasp the opposite ends of the film spool and move the two spool pieces axially toward one another until the flanges are axially positioned in firm clamping relation with the opposite sides of the film roll. While maintaining this inwardly directed manual pressure against the two spool pieces, one then must rotate the film spool relative to the cassette shell in an unwinding direction. As a result, the leading end of the film roll will be rotated relative to the insert, causing it to be advanced over the stripper-guides into the slot, and through the light-trapped opening to the exterior of the cassette shell. The film cassette disclosed in U.S. Pat. No. 4,407,579 has several shortcomings. For one, it must be operated manually to advance the leading end of the film roll to the exterior of the cassette shell. This must be done before the film cassette is loaded into a camera. Another shortcoming is that to increase the gripping effect of the two flanges at the opposite sides of the film roll, the flanges include a friction-producing material such as rubber which is axially compressed against the opposite sides of the film roll. This significantly increases the manufacturing expense of the film cassette. Moreover, it is possible especially in high temperature and/or humidity conditions that the opposite sides of the film roll may adhere to the rubber, in which instance a film advance failure may occur.

Commonly assigned U.S. Pat. No. 4,846,418, granted July 11, 1989 discloses a film cassette wherein the leading end of a film roll coiled about a film spool is located within the cassette shell. The film spool is comprised of two spool pieces constructed to telescopically receive one another. Each spool piece includes a radially extending flange normally disposed adjacent one of the opposite sides of the film roll. When the film spool is initially rotated in a film unwinding direction, a rotation-responsive cam device coupling the two spool pieces automatically moves one spool piece axially toward the other piece to cause the respective flanges to firmly clamp the film roll at its opposite sides. Then, with continued rotation of the film spool in the same direction, the leading end of the film roll will be advanced over a stripper-guide which strips the leading end from between the flanges and guides it through a light-trapped opening in the cassette shell to the outside of the cassette shell. The two flanges are slightly concave-shaped, and several ribs located on an interior wall of the cassette shell protrude radially between the flanges to circumferentially confine the outermost convolution of the film roll in order to prevent that convolution from clock-springing beyond the periphery of each flange. When the flanges firmly clamp the film roll at its opposite sides, the slight concave shape of the flanges may operate to slightly transversely pinch the outermost convolution of the film roll. In any event, the leading end of the film roll will tend to slightly separate from the next-inward convolution of the film roll to facilitate movement of the leading end over the stripper-guide responsive to rotation of the film spool in the film unwinding direction.

The Cross-Referenced Application

Cross-referenced application Ser. No. 320,441 discloses a film cassette similar to the one disclosed U.S. Pat. No. 4,846,418 except that the two flanges instead of being slightly concave-shaped each have an inside central annular flat face closely spaced from the respective sides of the film roll and an inside peripheral annular beveled face circumferentially inclined from the central flat face to normally intimately contact the outermost convolution of the film roll.

SUMMARY OF THE INVENTION

According to the invention, a film cassette comprising a cassette shell having a film passageway to the exterior of the cassette shell, a film spool rotatable within the cassette shell in a film unwinding direction and having a pair of coaxially spaced radial flanges, a convoluted film roll coiled about the spool between the flanges and having a film leader, and a rotation-responsive cam device adapted to move at least one of the flanges relatively closer to the other one into a firm frictional relation with an outermost convolution of the film roll to enable rotation of the spool in the unwinding direction to propel the film leader from the film passageway to the exterior of the cassette shell, is characterized in that:

at least one of the flanges is resiliently flexible; and the cam device includes camming means rotatable with respect to the spool in the unwinding direction for deflecting at least one of the flanges substantially at its periphery into the firm frictional relation with the outermost convolution of the film roll.

Preferably, the camming means is coaxially coupled with the spool. In addition, the spool includes a single core piece coaxially fixed to the flanges.

DETAILED DESCRIPTION OF THE PREFERRED EMBODIMENT

The invention is disclosed as being embodied preferably in a 35mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
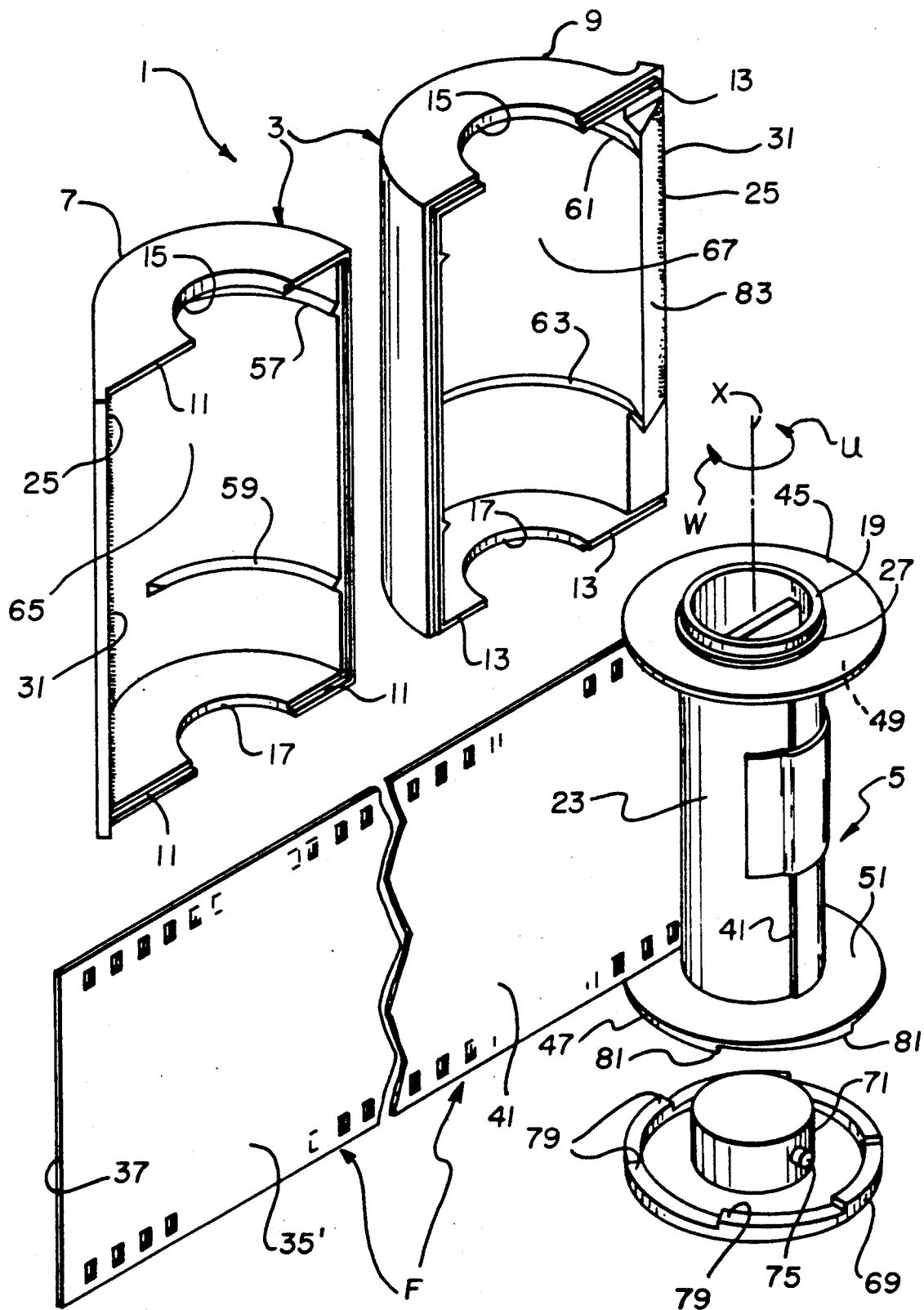
FIG. 1 is an exploded perspective view of a film cassette according to a preferred embodiment of the invention.
Figure 2:
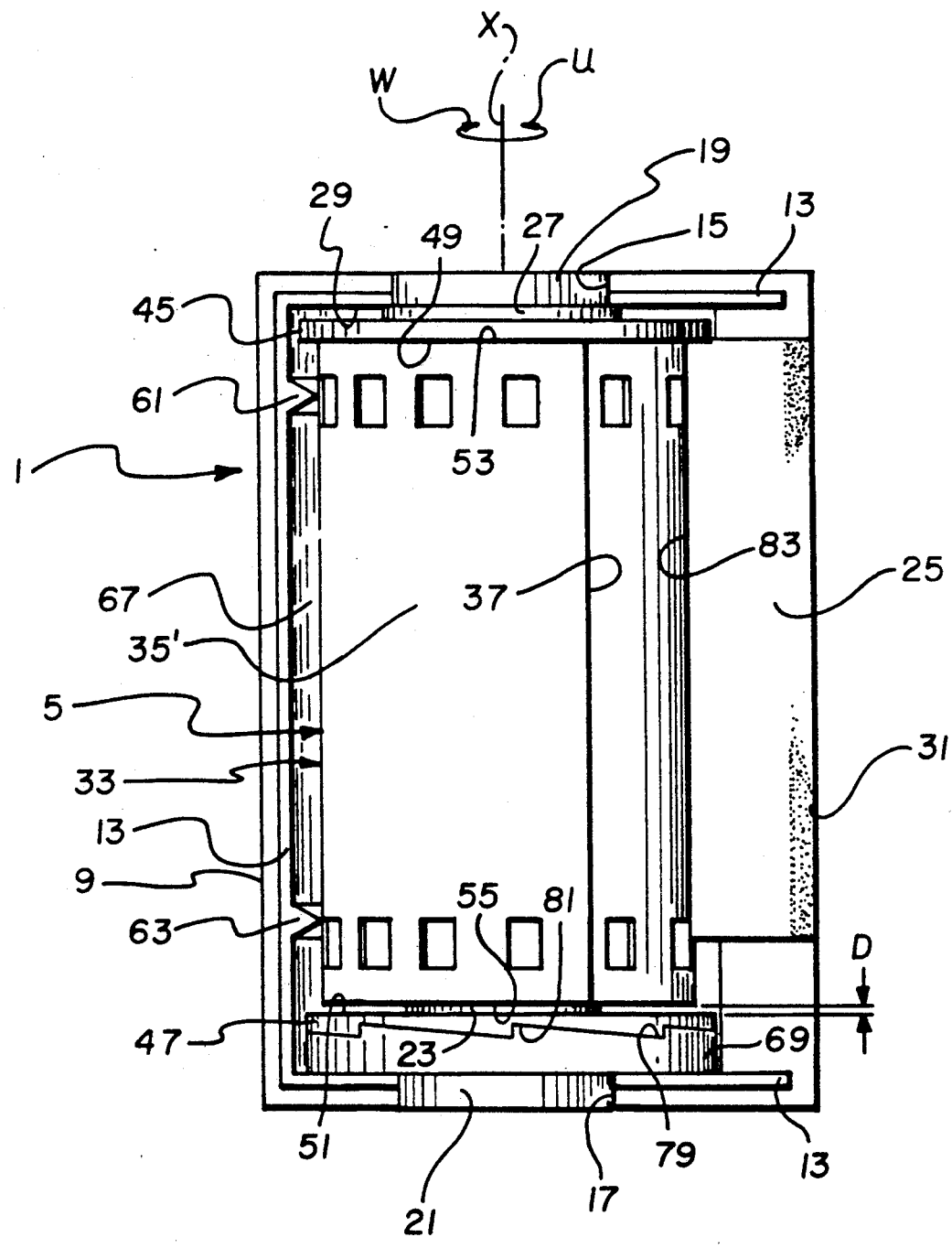
FIG. 2 is an elevation view of the film cassette, illustrating one-half of the cassette shell containing a film roll coiled about a film spool.

Referring now to the drawings, FIGS. 1 and 2 depict an improved 35mm film cassette 1 comprising a light-tight cassette shell 3 and a film spool 5 which is rotatable about an axis X in film unwinding and film winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for upper and lower opposite end extensions 19 and 21 of a spool core or hub assembly 23, and they define a film passageway 25 to the exterior of the cassette shell 3. The upper end extension 19 of the spool core 23 includes an integral annular surround 27 located against an upper inside face 29 of the cassette shell 3 which encircles the opening 15. This is to prevent ambient light from entering the interior of the cassette shell 3 through the opening 15. A known black velvet or plush material 31 lines the interior of the film passageway 25 to prevent ambient light from entering the film passageway.

Figure 3:
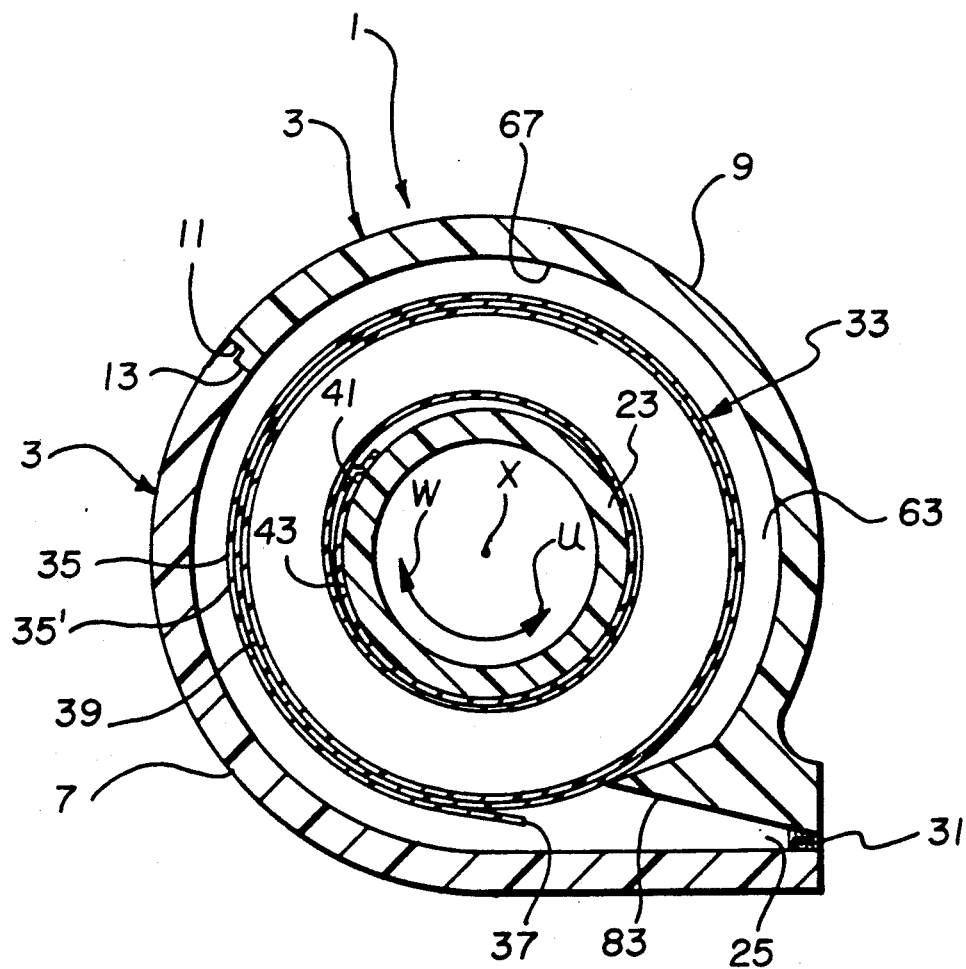
FIG. 3 is an end view in cross-section of the cassette shell, the film roll, and the film spool.

A roll 33 of 35mm filmstrip F is coiled about the spool core 23 to form successive film convolutions. As shown in FIG. 3, the film roll 33 includes an outermost convolution 35 which is a film leader 35' having a leading or forward end 37, and it includes a next-inward convolution 39 coiled behind the outermost convolution. An inner or trailing end 41 of an innermost convolution 43 of the film roll 33 is secured to the spool core 23 by conventional means (not shown).

A pair of upper and lower flanges 45 and 47 radially extending fixedly from the spool core 23 are coaxially spaced to locate their respective flat inside faces 49 and 51 substantially adjacent opposite sides 53 and 55 of the film roll 33. See FIG. 2. Preferably, the inside face 49 of the upper flange 45 contacts the side 53 of the film roll 33 and the inside face 51 of the lower flange 47 is slightly spaced a distance D from the side 55 of the film roll.

The maximum diameter of the film roll 33 is restricted to a value less than the diameter of the upper and lower flanges 49 and 51 by two pairs of arcuate ribs 57, 59 and 61, 63, fixed to the two halves 7 and 9 of the cassette shell 3 at their respective inner walls 65 and 67. The four ribs 57, 59, 61, and 63 protrude radially between the two flanges 49 and 51 to circumferentially confine the outermost convolution 35 of the film roll 33 to thereby prevent the outermost convolution from radially expanding or clock-springing beyond the peripheries of the flanges to the shell walls 65 and 67. See FIGS. 1-3. Preferably, the ribs 57, 59, 61, and 63 are relatively smooth at their respective areas of contact with the outermost convolution 35.

Figure 4:
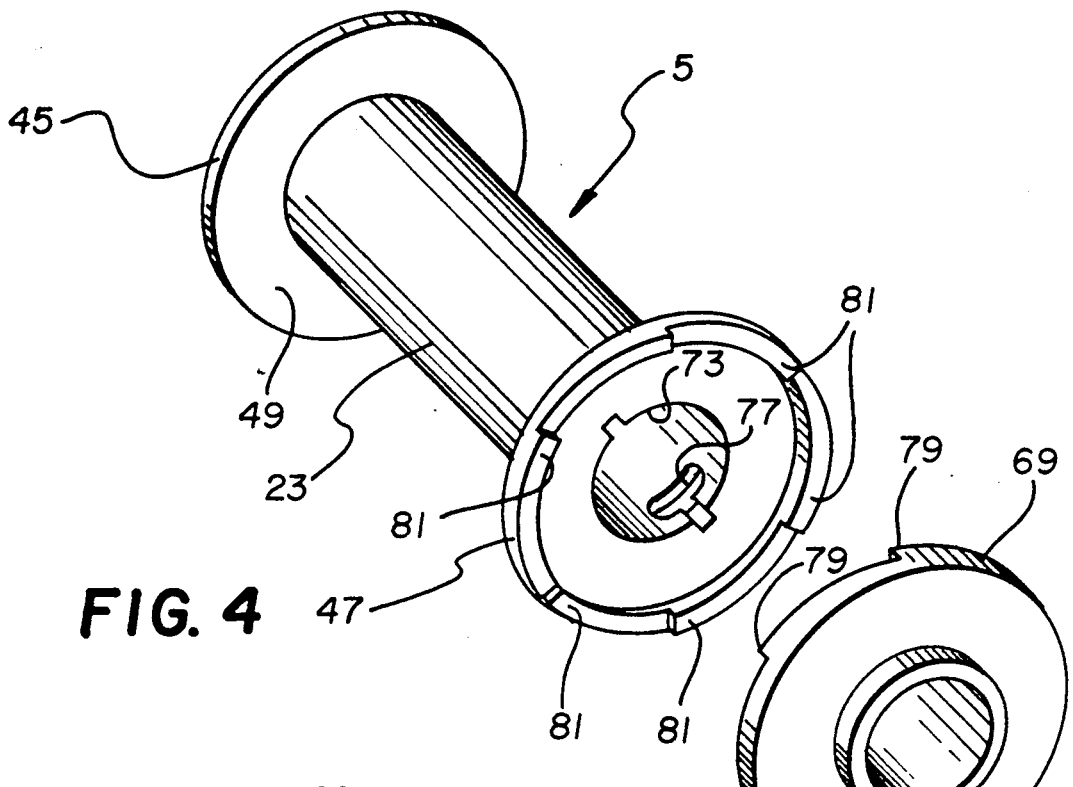
FIGS. 4 and 5 are exploded perspective views of the film spool and an associated camming flange.
Figure 5:
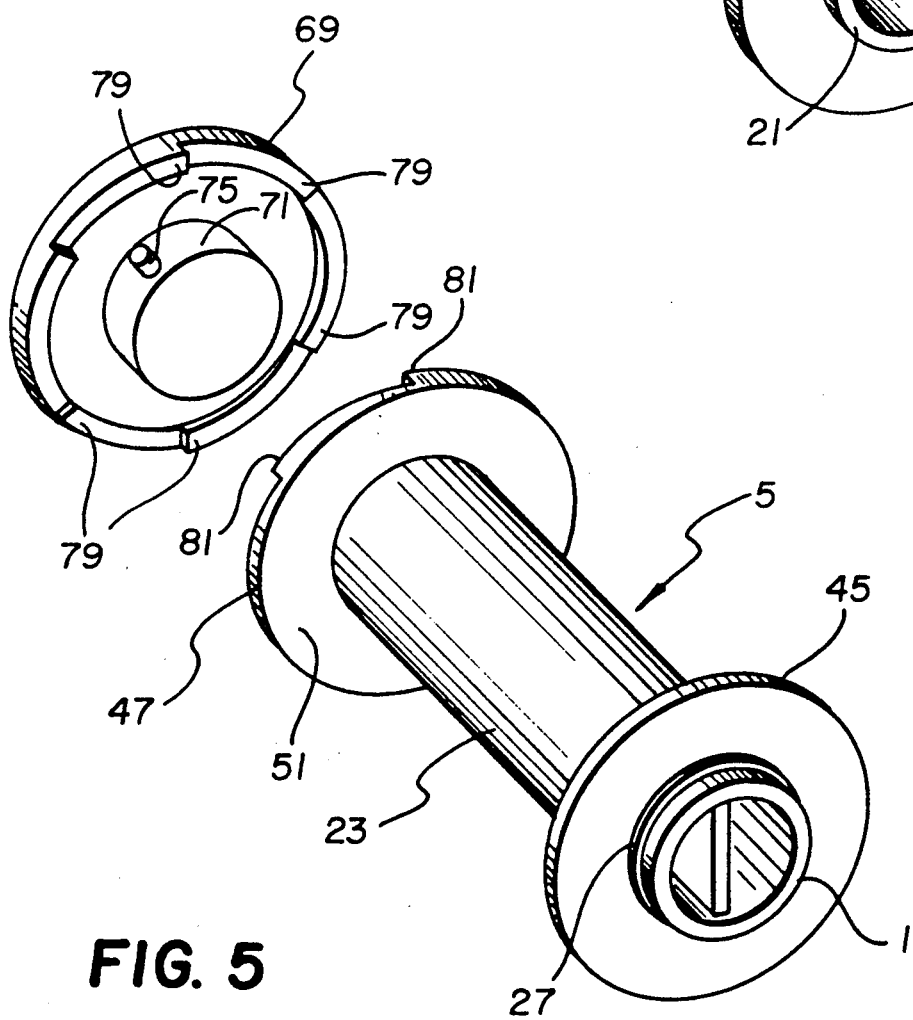

As shown in FIGS. 1, 4, and 5, the film spool 5 includes a camming flange 69 integrally coaxially formed with the lower end extension 21 of the spool core 23 and with a coupling element 71 which is received in a central well 73, through the spool flange 47, partly into the spool core. The coupling element 71 has a pair of coupling posts (only one shown) 75 which extend into respective slots 77 (only one shown), within the well 73, in the spool core 23 to limit rotation of the camming flange 69 relative to the spool flange 47 in the unwinding and winding directions U and W to approximately 55°. When the camming flange 69 is rotated relative to the spool flange 47 in the unwinding direction U approximately 55°, from its orientation shown in FIG. 2 to the orientation shown in FIG. 6, six identical camming surfaces 79 of the camming flange will impart motion to corresponding identical cam follower surfaces 81 of the spool flange 47 to flex (deflect) the latter flange the distance D at its periphery into a very firm frictional (compressive) relation with the outermost convolution 35 of the film roll 33 to axially clamp the outermost convolution between the two spool flanges 45 and 47. In essence, the inside face 51 of the spool flange 47 will be transformed from a flat shape to a generally concave shape. This concentrates the clamping forces provided by the two spool flanges 45 and 47 substantially at the outermost convolution 35. Then, continued rotation of the camming flange 69 in the unwinding direction U, in its orientation shown in FIG. 6, will rotate the spool core 23 including the two spool flanges 45 and 47 in the same direction to similarly rotate the film roll 33.

A film-stripper guide 83 integrally formed with the cassette half 7 is positioned immediately inward of the inner entry to the film passageway 25, to be received between the leading end 37 of the film leader 35' and the next-inward convolution 39, to pick up the leading end and guide it into the film passageway responsive to rotation of the film roll 33 in the unwinding direction U during application of the clamping forces provided by the (flexed) spool flange 47 and the (non-flexed) spool flange 45. The leading end 37 of the film leader 35' will be advanced over the stripper guide 83 and into the film passageway 25, rather than between the stripper-guide and the next-inward convolution 39, because it tends to be transversely bowed by the clamping forces and therefore will slightly separate from the next-inward convolution 39. Thus, continued rotation of the film roll 33 in the unwinding direction U will advance the film leader 35' to the exterior of the cassette shell 3.

Figure 6:
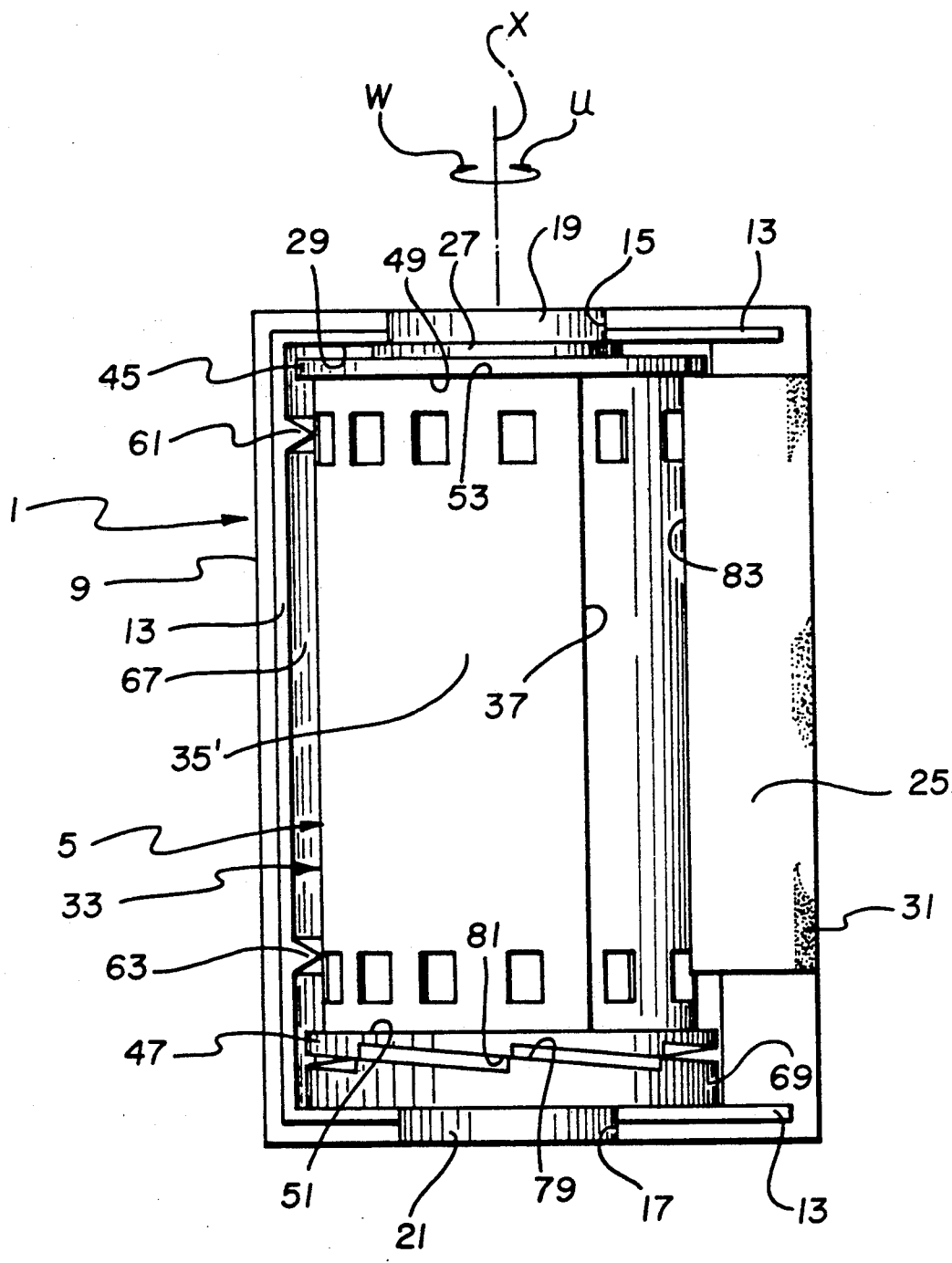
FIG. 6 is an elevation view similar to FIG. 2, illustrating operation of the camming flange.

When the camming flanges 69 is rotated approximately 55° relative to the spool flange 47 in the winding direction W, from its orientation shown in FIG. 6 to the orientation shown in FIG. 2, the camming surfaces 79 of the camming flange will interact with the cam follower surfaces 81 of the spool flange to allow the spool flange to return, by virtue of its own resilience, to the original non-deflected condition shown in FIG. 2. Since the periphery of the spool flange 47 will have moved the distance D, the periphery will have separated from the outermost convolution 35 of the film roll 33. This facilitates rewinding of the filmstrip F onto the spool core 23.

The invention has been described with reference to a preferred embodiment. However, it will be appreciated that variations and modifications can be effected within the ordinary skill in the art without departing from the scope of the invention. For example, the leading end 37 of the film leader 35' could normally be located within the film passageway 25, rather than as shown in FIGS. 2 and 3.

I claim:

1. A film cassette comprising a cassette shell having a film passageway to the exterior of said cassette shell, a film spool rotatable within said cassette shell in a film unwinding direction and having a pair of coaxially spaced radial flanges, a convoluted film roll coiled about said spool between said flanges and having a film leader, and a rotation-responsive cam device adapted to move at least one of said flanges relatively closer to the other one into a firm frictional relation with an outermost convolution of said film roll to enable rotation of the spool in the unwinding direction to propel said film leader from said film passageway to the exterior of said cassette shell, is characterized in that:
   at least one of said flanges is resiliently flexible; and
   said cam device includes camming means coaxially disposed with respect to said spool to rotate in the unwinding direction for deflecting a resiliently flexible one of said flanges substantially at is periphery into said firm frictional relation with the outermost convolution of said film roll.

2. A film cassette as recited in claim 1, wherein said camming means is coaxially coupled with said spool.

3. A film cassette as recited in claim 1, wherein said spool includes a single core piece coaxially fixed to said flanges.

4. A film cassette as recited in claim 1, wherein said flanges have respective inside faces located substantially adjacent opposite sides of said film roll, and said camming means is configured to deform said inside face of a resiliently flexible one of said flanges into a generally concave shape when the camming means deflects the one flexible flange at its periphery.

5. A film cassette as recited in claim 1, wherein said camming means cooperates with said spool and said cassette shell to substantially limit movement of the camming means to rotation in the film unwinding direction and a film winding direction.

6. A film cassette as recited in claim 1, wherein said camming means is rotatable with respect to said spool in a film winding direction opposite to the film unwinding direction and is configured to allow a resiliently flexible one of said flanges that has been deflected by the camming means to return to an original non-deflected condition when the camming means is rotated with respect to the spool in the winding direction.

7. A film cassette as recited in claim 1, wherein a resiliently flexible one of said flanges has a cam follower surface, and said camming means includes at least one radial flange coaxially coupled with said spool and having a camming surface disposed to impart motion to said cam follower surface of a resiliently flexible one of said flanges to deflect the one flexible flange at its periphery.

8. A film cassette comprising a cassette shell having a film passageway to the exterior of said cassette shell, a film spool rotatable within said cassette shell in film unwinding and film winding directions and having a pair of coaxially spaced radial flanges, a convoluted film roll coiled about said spool between said flanges and having a film leader, and a rotation-responsive cam device adapted to move at least one of said flanges relatively closer to the other one into a firm frictional relation with an outermost convolution of said film roll to enable rotation of the spool in the unwinding direction to propel said film leader from said film passageway to the exterior of said cassette shell, is characterized in that:
   at least one of said flanges is resiliently flexible; and
   said cam device includes camming means rotatable with respect to said spool in the unwinding direction for deflecting a resiliently flexible one of said flanges substantially at its periphery into said firm frictional relation with the outermost convolution of said film roll and rotatable with respect to the spool in the winding direction for allowing a resiliently flexible one of the flanges that has been deflected to return to an original non-deflected condition.

* * * * *